United States Patent [19]
Ingle

[11] Patent Number: 5,228,181
[45] Date of Patent: Jul. 20, 1993

[54] FLANGE ALIGNING DEVICE

[76] Inventor: Michael D. Ingle, 854 W. K St., Benicia, Calif. 94510

[21] Appl. No.: 954,893

[22] Filed: Sep. 30, 1992

Related U.S. Application Data

[63] Continuation-in-part of Ser. No. 749,939, Aug. 26, 1991, abandoned.

[51] Int. Cl.$^5$ .............................................. B25B 27/14
[52] U.S. Cl. ...................................... 29/272; 269/43; 228/49.3; 228/44.5
[58] Field of Search .................... 29/271, 272; 269/43; 228/49.3, 44.5

[56] References Cited

U.S. PATENT DOCUMENTS

| | | | |
|---|---|---|---|
| 3,015,883 | 1/1962 | Brown | 29/271 |
| 3,735,472 | 5/1973 | Silverman | 29/272 |
| 3,869,784 | 3/1975 | Simpson | 29/272 |
| 4,345,464 | 8/1982 | Herzl et al. | 29/272 |
| 4,662,055 | 5/1987 | Van Meter | 29/271 |
| 4,701,989 | 10/1987 | Cayzer | 29/271 |
| 5,052,608 | 10/1991 | McClure | 29/272 |

FOREIGN PATENT DOCUMENTS 1046250 1/1979 Canada.

Primary Examiner—Bruce M. Kisliuk
Assistant Examiner—Eileen P. Morgan
Attorney, Agent, or Firm—Schapp and Hatch

[57] ABSTRACT

A flange aligning device including an elongated body having a transverse internally threaded passage at each end and a carriage which can be moved along the body. A jacking screw is threaded into each of the internally threaded passages so that the distance between each end of the body and a pipe section which that end confronts can be determined by rotating one of the jacking screws. A tie plate is bolted to the carriage and is provided with elongated holes for receiving studs which pass through preexisting holes in the flange of one of the pipe sections. Different tie plates are provided to accommodate different pipe diameters, flanges, etc., each of which tie plates can be mounted on the carriage by means of bolts and associated tapped holes.

6 Claims, 3 Drawing Sheets

FLANGE ALIGNING DEVICE

This is a continuation-in-part of co-pending application Ser. No. 07/749,939 filed on Aug. 26, 1991 now abandoned.

BACKGROUND OF THE INVENTION

1. Field of the Invention

My present invention relates to pipe fitting tools, and more particularly to flange aligning devices for aligning the flanges of pipes, with or without intermediate spec blinds, check valves, butterfly valves, and the like.

2. Description of the Prior Art

Methods and apparatus for aligning the flanges of pipes, etc., which are to be joined, in order to permit the insertion of usual threaded studs into the aligned pairs of holes in the two adjacent flanges, are known in the prior art.

Apparatus of this kind is disclosed in U.S. Pat. No. 4,662,055, issued to Charles VanMeter on May 5, 1987, and entitled FLANGE ALIGNMENT TOOL AND METHOD FOR USING SAME. The flange alignment tool of VanMeter comprises a body portion having a first, relatively flat surface disposed for abutting engagement with a rear surface of a pipe flange and a second, curvilinear surface adjacent the first surface and shaped for complementary engagement with a curvilinear neck portion of the pipe flange adjacent the rear surface thereof. First and second spaced apart aligning pins extend through the body portion and include projecting flange-engaging pin ends positioned within an adjacent pair of through apertures in the flange. Resilient springs urge the aligning pins in a predetermined direction for encouraging positive engagement of the flange-engaging pin ends with the through apertures.

Another device of this type is shown and described in U.S. Pat. No. 4,345,446, issued to Peter J. Herzl, et al., on Aug. 24, 1982, and entitled CENTERING DEVICE FOR FLOW METERS INTERPOSED IN FLOW LINE.

The device of this patent is a camming device for centering a meter or other instrument having a cylindrical body with respect to the upstream and downstream pipes of a flow line in which the meter is interposed. Each pipe is provided with an end flange having a circle of bolt holes, the pipe flanges being bridged by clamping bolts which pass through the holes to engage and compress the meter, the holes having clearances allowing limited bolt play. Rotatably mounted on the meter body is a camming device provided with a symmetrical array of camming edges that tangentially engage the bolt holes. When the device is turned on the meter body, it acts to force the bolts to their extreme hole positions, as a result of which the meter body is caused to assume a position concentric with the bolt circle that is centered with respect to the pipes.

Another device of this type is shown and described in U.S. Pat. No. 3,015,883, issued to G. S. Brown on Jan. 6, 1962, and entitled FLANGE ALIGNING TOOL.

The apparatus disclosed in the Brown patent is an apparatus capable of aligning flanges for bolting wherein the fixed flange acts as the base for the apparatus and a movable grappling element with a protrusion or pin which fits into a hole of the flange to be aligned is adapted to hold the second flange and raise it into proper alignment for assembling with the fixed flange.

Yet another device of this type is shown and described in Canadian Patent No. 1,046,250, issued to Leo Mathieu on Jan. 16, 1979, and entitled FLANGE ALIGNER.

The device of the Mathieu Canadian patent comprises a body member having a protruding male index member terminating at a distal end, the said end being adapted to mate into an aperture of a flange, a protruding anvil member surmounting the male index member and extending beyond said distal end thereof to define thereat a location, an adjusting bearing member extending through that location and defining at one end a bearing surface, and means for adjusting the bearing member and hence the bearing surface relative to the distal end whereby alignment of adjacent flanges may be induced by the relative position between the distal end and the adjustable bearing surface.

It is believed that the documents listed immediately below contain information which is or might be considered to be material to the examination of this patent application.

U.S. Pat. No. 4,701,989
U.S. Pat. No. 3,869,784
U.S. Pat. No. 3,735,472

The term "prior art" as used herein or in any statement made by or on behalf of applicant means only that any document or thing referred to as prior art bears, directly or inferentially, a date which is earlier than the effective filing data hereof.

No representation is made that any of the above-listed documents is part of the prior art, or that a search has been made, or that no more partinent information exists.

A copy of each of the above-listed patents is being supplied to the Patent and Trademark Office herewith.

SUMMARY OF THE INVENTION

Accordingly, it is an object of my present invention to provide methods and apparatus for aligning the flanges of pipe sections, and for aligning the flanges of devices inserted in pipe lines, such as spec blinds, check valves, butterfly valves, spacers, etc., which methods and apparatus eliminate the need for rigging with slings or pulling devices.

Another object of my present invention is to provide methods and apparatus for aligning the flanges of pipe sections, and for aligning the flanges of devices inserted into pipe lines, such as spec blinds, check valves, butterfly valves, spacers, etc., which methods and apparatus eliminate the necessity for anchoring points remote from the pipe line.

Yet another object of my present invention is to provide methods and apparatus for aligning the flanges of pipe sections, and for aligning the flanges of devices inserted into pipe lines, such as spec blinds, check valves, butterfly valves, spacers, etc., which methods and apparatus make it possible to align such flanges in close quarters.

A still further object of my present invention is to provide methods and apparatus for aligning the flanges of pipe sections, and for aligning the flanges of devices inserted into pipe lines, such as spec blinds, check valves, butterfly valves, spacers, etc., by which methods and apparatus workers in the art may correct misalignments far greater than those which can be corrected by means of the well known bull pins.

An additional object of my present invention is to provide apparatus for aligning the flanges of pipe sections, and for aligning the flanges of in-line devices inserted into pipe lines, such as spec blinds, check valves, butterfly valves, spacers, etc., which apparatus is capable of straddling many types of spec blinds, check valves, butterfly valves, spacers, etc., and is thus capable of aligning the flanges of the pipe sections on either side of such in-line devices.

A yet further object of my present invention is to provide apparatus of the abovedescribed kind which is adapted for the aligning of the flanges of a wide variety of pipes.

Another object of my present invention is to provide apparatus of the abovedescribed kind the operation of which is safer and easier than the operation of many prior art flange aligning expedients, and particularly slings, pulling devices, etc.

Other objects of my present invention will in part be obvious and will in part appear hereinafter.

My invention, accordingly, comprises the several steps and the relation of one or more such steps with respect to each of the others, and the apparatus embodying features of construction, combinations of elements, and arrangements of parts which are adapted to effect such steps, all as exemplified in the following disclosure, and the scope of my present invention will be indicated in the claims appended hereto.

In accordance with a principal feature of my present invention a flange aligning device thereof is comprised of an elongated rigid rail member upon which is slidably mounted a carriage from which depends a tie plate having a plurality of holes which may be aligned with stud-receiving holes in a pipe flange.

In accordance with another principal feature of my present invention said carriage is provided with at lest one set screw adapted to frictionally engage a part of said rail member, whereby said carriage may be frictionally locked to said rail member after being moved to a desired location on said rail member.

In accordance with yet another principal feature of my present invention a sleeve having a threaded bore is provided at each end of said rail member, and each of these bore contains a jacking bolt threadedly engaged with said threaded bore, which jacking bolts may be rotated about their axes to bring them into contact with either the flanges or walls of adjacent pipe sections, and then may be further rotated to apply such forces to studs engaged with holes in one pipe flange that the flanges of two adjacent pipe sections may be forced into alignment to such an extent that conventional threaded studs may be passed through the registering holes in the adjacent flanges.

In accordance with a further principal feature of my present invention the tie plate of a flange aligning device of my invention may be bolted to the carriage thereof, so that different tie plates may be used to accommodate different pipe flanges, having different hole arrangements.

For a fuller understanding of the nature and objects of my present invention, reference should be had to the following detailed description, taken in connection with the accompanying drawings.

DESCRIPTION OF THE PREFERRED EMBODIMENTS

Figure 1:
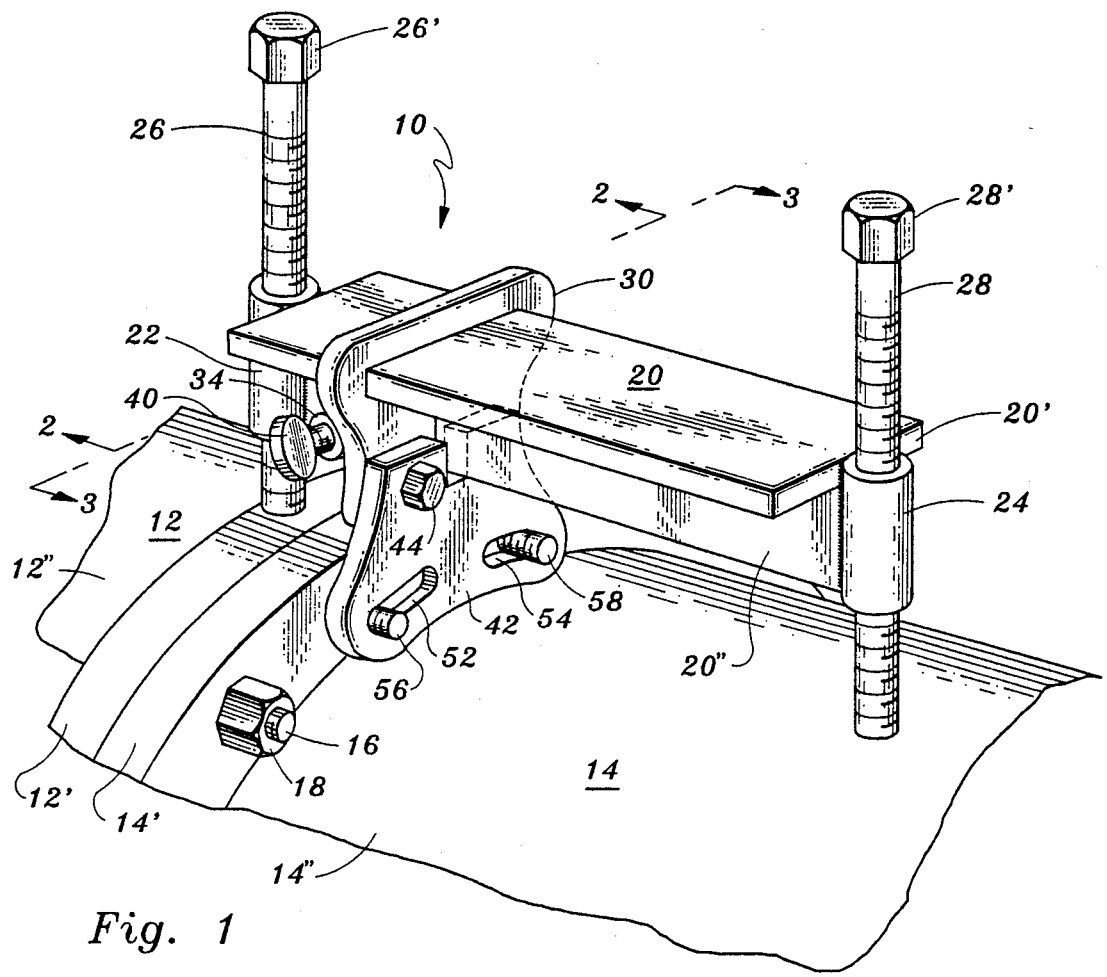
FIG. 1 is a perspective view of a flange aligning device of my invention, as seen at the conclusion of the aligning thereby of the flanges of two adjacent pipe sections.

Referring now to FIG. 1, there is shown a flange aligner 10 constructed in accordance with the preferred embodiment of my invention.

As shown in FIG. 1, flange aligner 10 is mounted at the conjunction of two pipe sections 12, 14. In the well known manner, pipe section 12 is comprised of a flange 12' and a wall 12", both of which are shown in part only. Similarly, pipe section 14 is comprised of a flange 14' and a wall 14", both of which are shown in part only.

As is well known to those having ordinary skill in the art, both of the flanges 12', 14' are of substantially the same inner diameter and the same outer diameter, and both flanges 12', 14' are provided with a plurality of stud-receiving bores. Also in the known manner, the axes of these bores all intersect a common circle, known as the "bolt circle". Thus, when flanges 12', 14' are brought into alignment the axis of each bore in flange 12' is coincident with the axis of a corresponding bore in flange 14', whereby a threaded stud, e.g., 16, may be passed through each registered pair of flange bores in the well known manner. Subsequently, then, a bolt is applied to each end of each such threaded stud, and the two bolts on each threaded stud are brought to firmly bear against their corresponding flanges. Thus, in the well known manner, flanges 12', 14' are brought into mutually confronting, registered, tightly-fitting relation by means of a threaded stud passing through each pair of aligned flange bores, and the bolts on each such stud are brought to bear against their associated flanges, all in the known manner.

As will be understood by those having ordinary skill in the art, informed by the present disclosure, pipe sections 12, 14 are shown in FIG. 1 in their aligned condition, as a result of the operation of flange aligner 10, at least one threaded stud 16 having been passed through two flange bores which have been brought into alignment by the use of flange aligner 10 of my invention.

Figure 4:
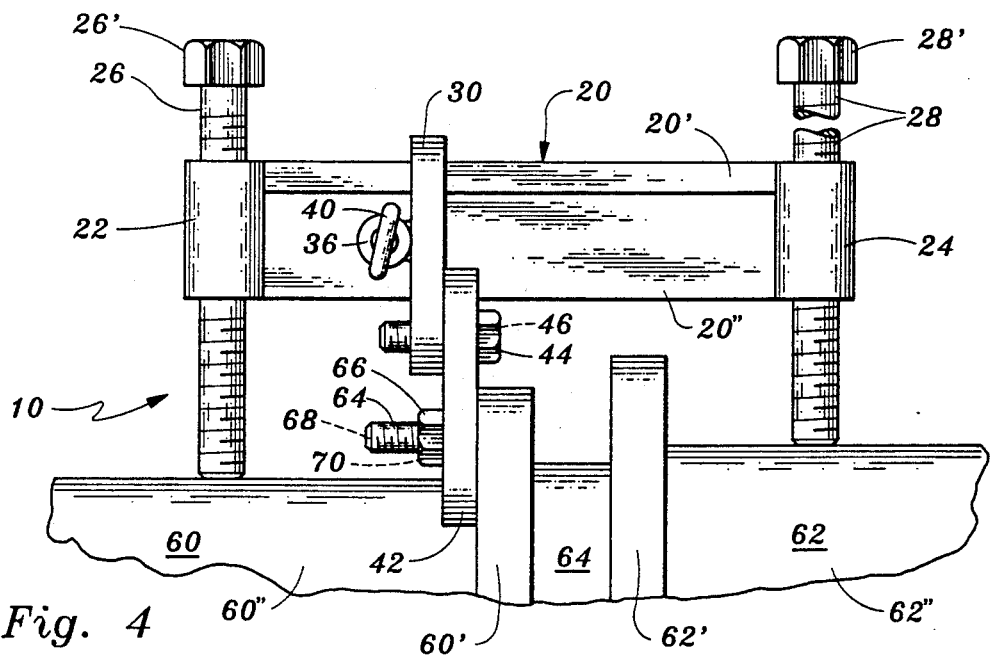
FIG. 4 is an elevational view of a flange aligning device of my invention, mounted on two pipe sections and straddling a spec blind which is to be secured between the adjacent flanges of the two pipe sections, at a time when the device of my invention has been mounted on said pipe sections but has not yet been operated to force those pipe sections into alignment.

As will be seen by those having ordinary skill in the art, by comparison of FIGS. 1 and 4, it is a particular feature of my invention that flabge aligner 10 is capable not only of aligning pipe flanges which are in immediate, face-to-face contact, as is FIG. 1, but is also capable of aligning pipe flanges which are separated by an intermediate in-line device, such as a spec blind, a check valve, a butterfly valve, a spacer, or the like.

It is also to be noted that in FIG. 4 flange aligner 10 of my invention is shown in an early stage of its flange aligning operation, wherein it has been applied to two pipe sections, but has not been operated to bring those pipe sections into alignment.

Referring again to FIG. 1, it will be seen that flange aligner 10 of my invention is comprised of an elongated, rigid beam member or rail 20 which is of substantially the same T-shaped cross section throughout and is fabricated from a rigid metallic material, such as a high tensile steel.

For convenience of discussion, and by analogy to the terminology used in connection with structural steel beams, the horizontal upper portion of beam 20, as shown in FIG. 1, will hereinafter be designated as the flange 20', and the vertical portion thereof will be designated as the web 20". Beam 20 will preferably be cut from a single piece of rolled steel stock, and thus flange 20' and web 20" will be integral. In certain embodiments of my invention, however, flange 20' and web 20" may be separate pieces joined throughout their intersecting faces by arc welding.

As further seen in FIG. 1, an internally threaded collar 22 is affixed to one end of beam 20, as by arc welding, and internally threaded collar 24 is affixed to the opposite end of beam 20, as by arc welding. In the known manner, collars 22, 24 may be drilled and tapped, or tapped, after being weldedly secured to the opposite ends of beam 20.

As also seen in FIG. 1, flange aligner 10 of my invention further comprises a jacking bolt 26 which is threadedly engaged in the tapped bore of collar 22, and a jacking bolt 28 which is threadedly engaged in the tapped bore of collar 24. Jacking bolt 26 is provided with a head 26' of well known configuration, which head is adapted to be engaged with a wrench of well known type for advancing jacking bolt 26 through collar 22 for the purpose of forcing pipe sections 12, 14 into alignment in accordance with the method of my invention. Similarly, jacking bolt 28 is provided with a head 28' of well known configuration.

As also seen in FIG. 1, a carriage plate or carriage 30 is slidably mounted on beam 20 for selected positioning at any desired location along beam 20.

Figure 2:
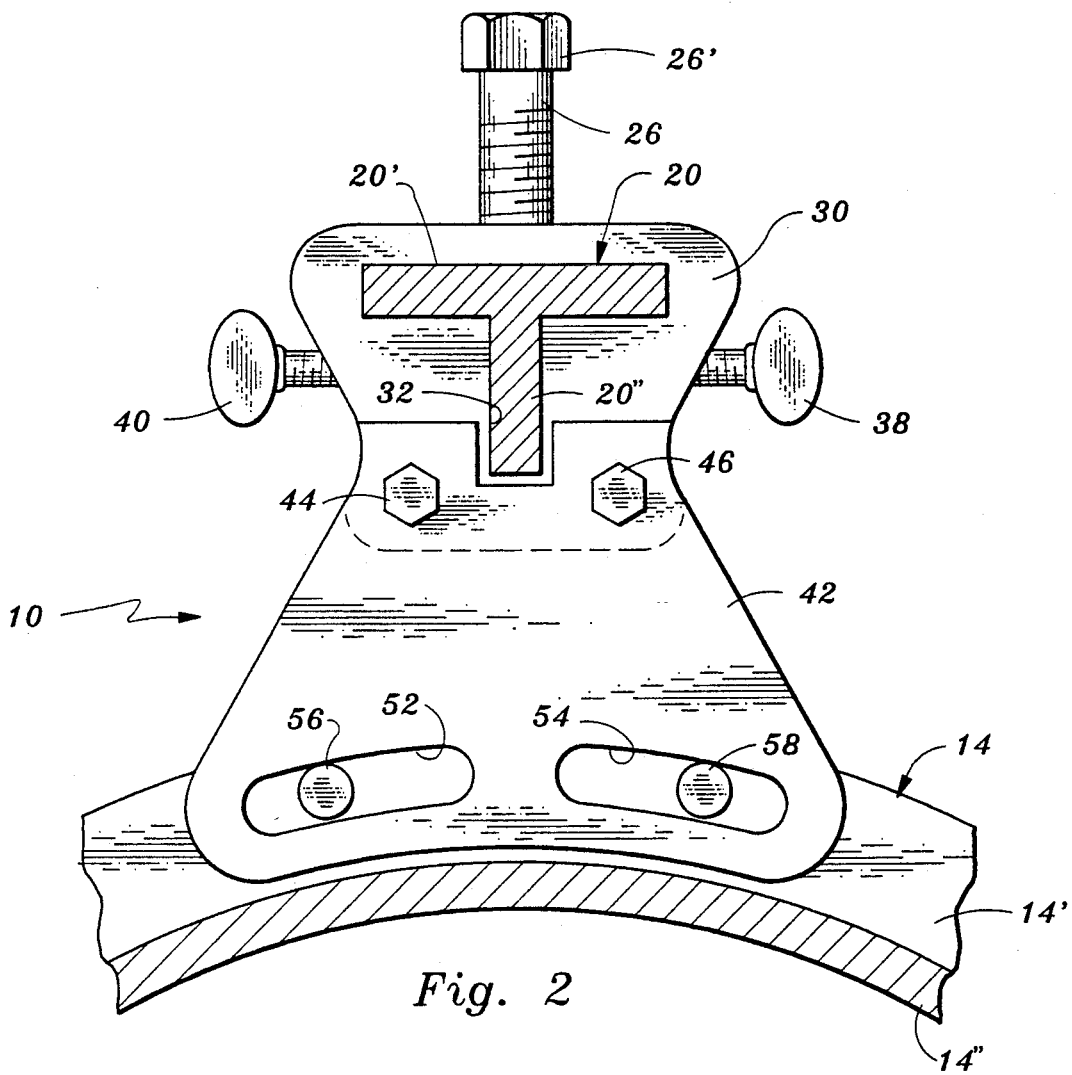
FIG. 2 is an elevational view, partially in section, of the flange aligning device of my invention shown in FIG. 1, taken on plane 2—2 of FIG. 1.

As best seen in FIG. 2, carriage plate 30 is provided with a T-slot 32 which closely embraces beam 20, both the flange 20' and the web 20" thereof. It is to be understood that while carriage plate 30 close-fittingly embraces beam 20 the clearance between carriage plate 30 and beam 20 is sufficient so that carriage plate 30 is easily slidable along beam 20.

Figure 3:
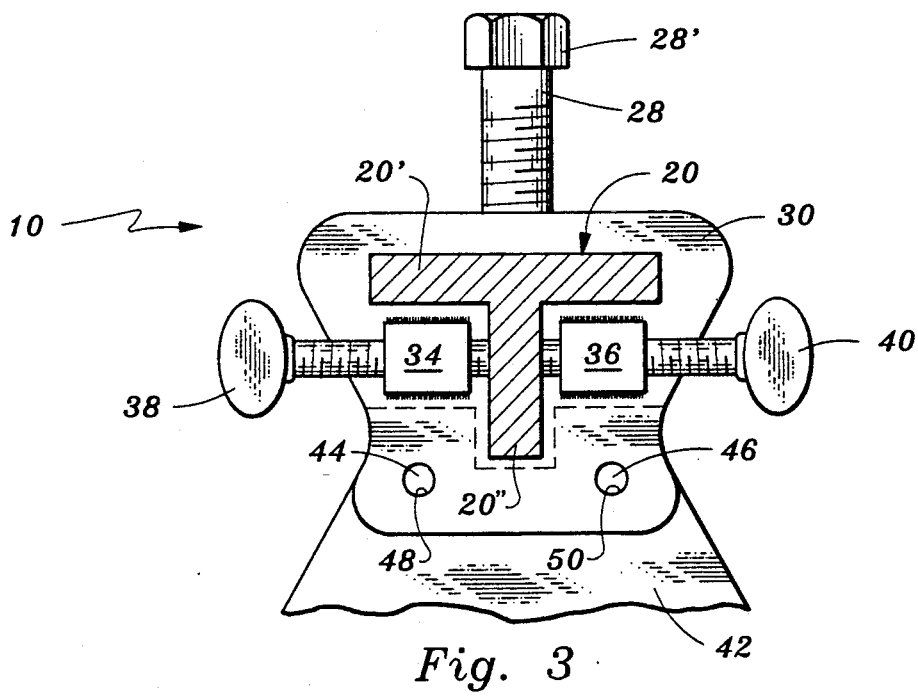
FIG. 3 is an elevational view, partially in section, of the flange aligning device of my invention shown in FIG. 1, taken on plane 3—3 of FIG. 1.

As may be seen by comparison of FIGS. 1 and 3, carriage plate 30 is provided on one side thereof with a pair of projections 34, 36, which projections are permanently affixed to carriage plate 30.

Each of these projections 34, 36 is generally cylindrical in shape, and is provided with an axial threaded bore the axis of which is directed generally perpendicularly to web 20" when carriage plate 30 is mounted on beam 20.

As further seen in FIG. 3, a wing-headed set screw 38 is threadedly engaged in the threaded bore in projection 34, such that it can be brought into direct contact with web 20" by manual manipulation of its wing head.

Similarly, a wing-headed set screw 40 is threadedly engaged in a threaded bore in projection 36 (FIG. 3), such that it can be brought into contact with web 20" by manipulation of its wing head.

As will now be understood by those having ordinary skill in the art, informed by the present disclosure, set screws 38, 40 may be used to fix carriage plate 30 to beam 20 at any desired location of the range of travel of carriage plate 30 along beam 20.

Comparing FIGS. 1 and 2, it will be seen that a tie plate 42 is affixed to carriage plate 30 by means of a pair of short bolts 44, 46.

As best seen in FIG. 3, a pair of tapped bores 48, 50 is provided in the lower portion of carriage plate 30, which tapped bores are adapted to receive and threadedly engage with the shanks of bolts 44, 46, respectively.

Thus, it will be evident to those having ordinary skill in the art, informed by the present disclosure, that tie plate 42 is secured to the lower portion of carriage plate 30 by means of bolts 44, 46 the shank of each of which is received in and threadedly engaged with a corresponding tapped bore 48, 50 in the lower portion of carriage plate 30.

As may be seen by comparison of FIGS. 1 and 2, a pair of arcuate openings 52, 54 are provided in the lower end of tie plate 42, which arcuate openings are adapted to be aligned with flange bores in flange 14'.

It is to be understood that in accordance with the principles of my invention a plurality of tie plates are provided of which tie plate 42 is only one. Each of these tie plates is provided with a particular arrangement of arcuate openings the width and radius of curvature of which is adapted for alignment with flange bores of a particular unique range of standard pipe flanges.

As best seen in FIG. 1, flange aligner 10 of my invention is coupled to flange 14' by means of a pair of standard threaded studs 56, 58, each of which passes substantially through an existing flange bore of flange 14' and also through one of the arcuate openings 52, 54 provided in tie plate 42.

Referring now to FIG. 4, there is shown a different application of flange aligner 10 of my invention from that shown in FIG. 1, at a different stage of the aligning operation according to the method of my invention.

As seen in FIG. 4, flange aligner 10 of my invention is applied to two pipe sections 60, 62. Pipe section 60, which is shown in part only, includes a wall 60" and a flange 60', and pipe section 62, which is also only partly shown, includes a wall 62" and a flange 62'.

In FIG. 4, a spec blind 64 is interposed between flanges 60', 62'. This is in contrast with the application of flange aligner 10 of my invention shown in FIG. 1, wherein pipe flanges 12', 14' are in direct contact.

It is also to be noted that in FIG. 4, while spec blind 64 and flange 60' are in alignment, flange 62' is misaligned with respect to flange 60' and spec blind 64. Thus, it will be understood that an earlier stage of the operation of flange aligner 10 in accordance with the method of my invention is shown in FIG. 4.

It is also to be noted that in FIG. 4 the threaded stud 64 which passes through one of the arcuate openings in tie plate 42, and through a bore in flange 60', is provided with a nut 66 which is snug against the outer face of tie plate 42, thus limiting the penetration of threaded stud 64 into the associated flange bore in flange 60', so that it does not contact spec blind 64.

As will be evident to those having ordinary skill in the art, a corresponding threaded stud 68 and nut 70 (not shown) coact with the other arcuate opening in tie plate 42, and with another flange bore of flange 60'.

The Method of My Invention

In accordance with the principles of my invention flange aligner 10 of my invention may be applied to two misaligned flanged pipes at the junction thereof, in order to bring the flanges of those two pipes into alignment so that conventional threaded studs can be passed through the flange bores of those flanges in the following manner.

Before applying flange aligner 10 to these misaligned pipes, the tie plate 42 corresponding to the particular type of pipe to be aligned is mounted on carriage plate 30 by means of bolts 44, 46.

Set screws 38, 40 are then manually loosened so that carriage plate 30, etc., can be moved along beam 20 to any desired location therealong.

A pair of threaded studs and associated nuts are prepared, so that the portions of the threaded studs passing through tie plate 42 and the flange of one pipe will not pass into the bores in the flange of the other pipe.

The lower ends of jacking bolts 26, 28 are then placed on the walls of the pipe sections, respectively, near the most accessible one of the two points of maximum misalignment, and carriage plate 30 is moved along beam 20 until tie plate 42 is in contact with the outer face of one of the pipe flanges.

Jacking bolts 26, 28 are then manipulated until beam 20 is substantially parallel to the walls of the pipes and the arcuate openings 52, 54 in tie plate 42 are in registration with the closest two flange holes in the adjacent flange.

Set screws 38, 40 are then manipulated to affix carriage plate 30 to beam 20, and threaded studs 64, 68 are passed through arcuate openings 52, 54 in tie plate 42 and thence into the registered flange holes in flange 60'.

Jacking bolts 26, 28 are then rotated by means of a suitable wrench or wrenches, keeping beam 20 substantially parallel to the walls of the pipe sections, until the pipes and their flanges are forced into alignment.

Standard threaded studs are then passed through all of the associated pairs of flange bores which have been sufficiently brought into registration, and a pair of nuts fitted to each end of each such threaded stud and manually snugged against its associated flange.

It may be necessary in some cases to unship flange aligner 10 from these pipes and to reinstall it in a location approximately 90° around the axes of these pipes in order to be able to install all of the standard threaded studs joining the flanges.

After the completion of the above steps, one of the jacking screws 26, 28 is counter-rotated by a few turns, thus making it possible to manually remove threaded studs 64, 68, and the remaining standard threaded studs are inserted into the now aligned flange holes, and the associated nuts fitted thereto.

After tightening all of the nuts associated with each of the threaded studs passing completely through the aligned flange holes in these flanges, the space between these flanges will be completely closed, and flange aligner 10 will be available for use in connection with another joint in the same pipeline, as necessary.

Figure 5:
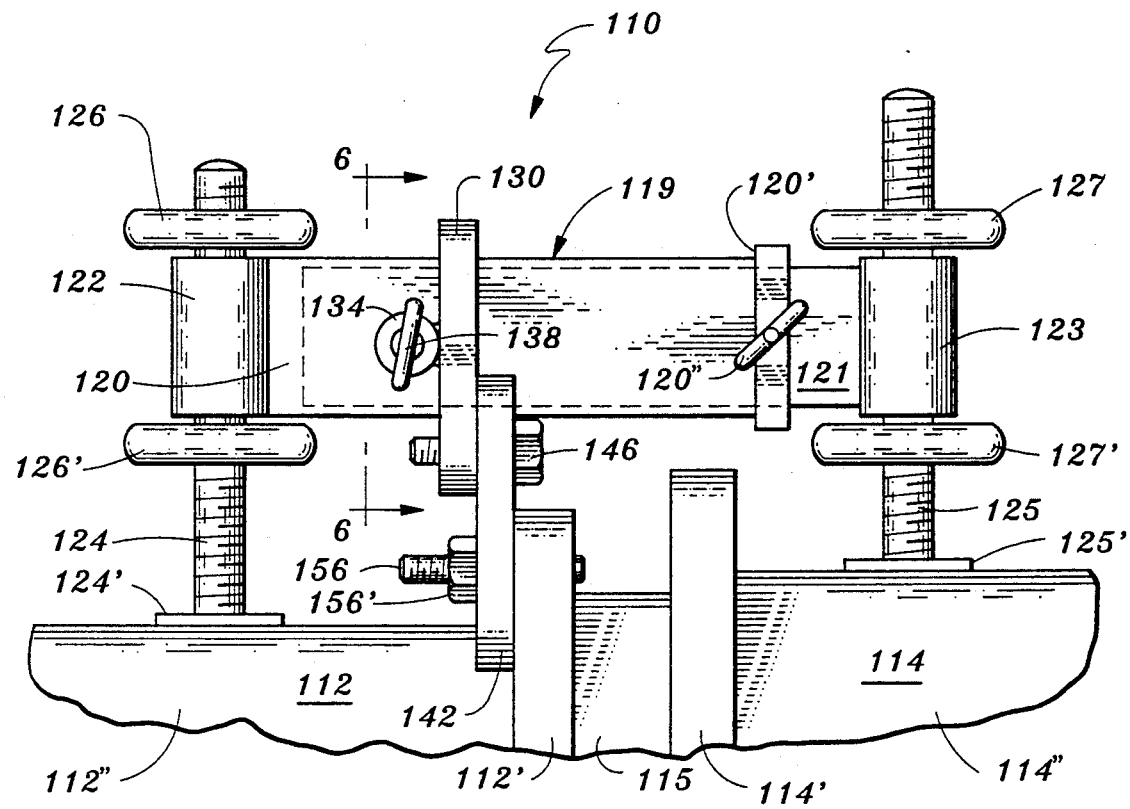
FIG. 5 is an elevational view of a flange aligning device of the second preferred embodiment of my invention.
Figure 6:
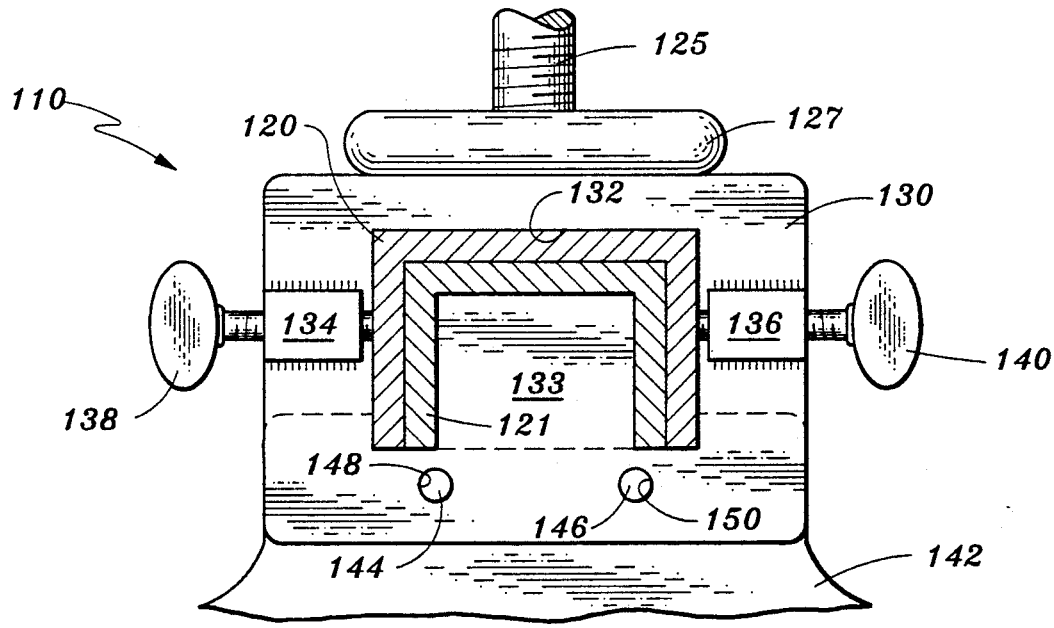
FIG. 6 is an elevational view of the flange aligning device of the second preferred embodiment of my invention, taken on plane 6—6 of FIG. 5.

Referring now to FIGS. 5 and 6, there is shown a flange aligner 110 constructed in accordance with the second preferred embodiment of my invention.

As seen in FIG. 5, flange aligner 110 of the second preferred embodiment of my invention is applied to two pipe sections 112, 114. Pipe section 112, which is shown in part only, includes a wall 112" and a flange 112', and pipe section 114, which is also partly shown, includes a wall 114" and a flange 114'.

In FIG. 5 a spec blind 115 is interposed between flanges 112', 114'.

It is to be noted that in FIG. 5, while spec blind 115 and flange 112' are in alignment, flange 114' is misaligned with respect to flange 112' and spec blind 115. Thus, it will be understood that an early stage of the operation of flange aligner 110 in accordance with the method of my invention is shown in FIG. 5.

It is also to be noted that in FIG. 5 a threaded stud 156, which passes through an arcuate opening in tie plate 142, and through a bore in flange 112', is provided with a nut 156' which is snug against the outer face of tie plate 142, thus limiting the penetration of threaded stud 156 into the associated flange bore in flange 112', so that it does not contact spec blind 115.

As will be evident to those having ordinary skill in the art, informed by the present disclosure, a corresponding threaded stud 158 and nut 158' (not shown) coact with another arcuate opening in tie plate 142, and with another flange bore of flange 112'.

Referring again to FIG. 5, and comparing it with FIG. 6, it will be seen that flange aligner 110 of my invention is comprised of an elongated extensible beam 119, and that beam 119 is principally comprised of two interengaged U-shaped beam or channel members 120, 121.

As best seen in FIG. 6, channel members 120, 121 are both U-shaped in cross-section, and are mutually interangaged, channel member 121 being close-fittingly received within channel member 120.

Referring again to FIG. 5, it will be seen that a first end of channel member 120 is provided with an outwardly projecting flange 120'.

A wing-headed set screw 120" is interengaged with a threaded bore in flange 120'.

Thus, it will be seen by those having ordinary skill in the art, informed by the present disclosure, that wing-headed set screw 120", etc., provides means whereby channel member 120 and channel member 121 can be locked together in any desired degree of mutual engagement, and thus the length of beam 119 can be selected by the user within limits determined by the respective lengths of channel members 120 and 121.

Each channel member 120, 121 is closed at one end by means of an end plate which is affixed therein, as by brazing.

A collar 122 is affixed to the end plate of beam member 120, as by brazing. Similarly, a collar 123 is affixed to the end plate of beam member 121, as by brazing.

A threaded rod or stud 124 is close-fittingly received in collar 122, and a threaded rod or stud 125 is close-fittingly received in collar 123.

A pair of discate nuts 126, 126' are threadedly engaged with stud 124, and are located above and below collar 122, respectively.

A pair of discate nuts 127, 127' are threadedly engaged with stud 125 and are located above and below collar 123, respectively.

A foot plate 124' of greater area than the cross-sectional area of stud 124 is affixed to the lower end of stud 124 adjacent pipe 112, and a foot plate 125' of greater area than the cross-sectional area of stud 125 is affixed to the lower end of stud 125, adjacent pipe 114.

As will be evident to those having ordinary skill in the art, informed by the present disclosure, discate nuts 126, 126' may be operated in such manner as to maintain collar 122, and thus the closed end of channel member 120, at such a distance from pipe 112 as to align the arcuate openings in tie plate 142 with the corresponding holes in flange 112'.

Discate nut 127' may then be operated in such manner as to force pipe 114 into axial alignment with pipe 112.

As may be seen by comparison of FIGS. 5 and 6, a carriage plate 130 is slidably mounted on beam 119 for selective positioning at any desired location along channel 120.

As best seen in FIG. 6, carriage plate 130 is provided with an opening 132 which closely embraces channel member 120 and includes a tongue 133 which extends into channel member 121. It is to be understood that while carriage plate 130 close-fittingly embraces beam 119, the clearance between carriage plate 130 and beam 119 is sufficient so that carriage plate 130 is easily slidable along beam 119.

As may be seen by comparison of FIGS. 5 and 6, carriage plate 130 is provided on one side thereof with a pair of projections 134, 136, which projections are permanently affixed to carriage plate 130.

Each of these projections 134, 136 is generally cylindrical in shape, and is provided with an axial threaded bore the axis of which is directed generally perpendicularly to the sides of channel member 120 when carriage plate 130 is mounted on beam 119.

As seen in FIG. 6, a wing-heated set screw 138 is threadedly engaged in the threaded bore in projection 134, such that it can be brought into direct contact with beam member 120 by manual manipulation of its winghead.

Similarly, a wing-headed set screw 140 is threadedly engaged in the threaded bore in projection 136, such that it can be brought into contact with beam member 120 by manipulation of its wing head.

As will now be understood by those having ordinary skill in the art, informed by the present disclosure, set screws 138, 140 may be used to fix carriage plate 130 to channel member 120 at any desired location of the range of travel of carriage plate 130 along channel member 120.

Comparing FIGS. 5 and 6, it will be seen that tie plate 142 is affixed to carriage plate 130 by means of a pair of short bolts 144, 146.

As best seen in FIG. 6, a pair of tapped bores 148, 150 is provided in the lower portion of carriage plate 130, which tapped bores are adapted to receive and threadedly engage with the shanks of bolts 144, 146, respectively.

A pair of arcuate openings 152, 154 are provided in the lower end of tie plate 142, which arcuate openings are adapted to be aligned with flange bores in flange 112'.

As will be understood by those having ordinary skill in the art, informed by the present disclosure, arcuate openings 152, 154 are provided for the same purpose and function in the same manner as arcuate openings 52, 54 of the first preferred embodiment of the present invention.

It is to be understood that in accordance with the principles of my invention a plurality of tie plates are provided in the second preferred embodiment of which tie plate 142 is only one. Each of these tie plates is provided with a particular arrangement of arcuate openings the width and radius of curvature of which is adapted for alignment with flange bores of a particular unique range of standard pipe flanges.

In accordance with a third preferred embodiment of my invention the device of the second preferred embodiment may be modified as follows:

1. Tongue 133 may be eliminated from carriage plate 130, and thus opening 132 may be made rectangular.

2. Channel members 120, 121 may be replaced by rectangular tubular members which are mutually, telescopingly interengaged.

3. Discate nuts 126, 126', 127, 127', may be replaced by large wingnuts capable of being operated by a gloved human hand.

It will thus be seen that the objects set forth above, among those made apparent from the preceding description, are efficiently attained, and since certain changes may be made in the above constructions and the method carried out thereby without departing from the scope of my present invention, it is intended that all matter contained in the above description or shown in the accompanying drawings shall be interpreted as illustrative only, and not in a limiting sense.

It is also to be understood that the following claims are intended to cover all of the generic and specific features of my invention hereindescribed, and all statements of the scope of my invention which, as a matter of language, might be said to fall therebetween.

What is claimed is:

1. a flange aligning device, comprising:
an elongated rigid body member;
a first internally threaded passage located adjacent one end of said body member;
a second internally threaded passage located adjacent the other end of said body member and parallel to said first internally threaded passage;
first screw means threadedly engaged in said first internally threaded passage;
second screw means threadedly engaged in said second internally threaded passage;
a carriage mounted on said body member and slidable therealong; and
a tie plate mounted on said carriage and provided with elongated holes for receiving studs which pass through holes in a pipe flange.

2. A flange aligning device as claimed in claim 1 in which said tie plate is removably mounted on said carriage, whereby alternative tie plates suitable to alternative pipe flanges may be mounted on said carriage.

3. A flange aligning device as claimed in claim 1, further comprising at least one thumb screw mounted on said carriage whereby the position of said carriage on said body member may be fixed.

4. A flange aligning device as claimed in claim 2, further comprising at least one thumb screw mounted on said carriage whereby the position of said carriage on said body member may be fixed.

5. A flange aligning device as claimed in claim 1 in which the length of said elongated rigid body member is variable.

6. A flange aligning device as claimed in claim 1 in which each of said screw means is threadedly engaged with a pair of nuts, each pair of said nuts confines said body member, and said passages are devoid of threads.

* * * * *